(12) United States Patent
Kananda

(10) Patent No.: US 11,648,991 B2
(45) Date of Patent: *May 16, 2023

(54) QUICK-DETACH STORAGE SYSTEM WITH CONFIGURABLE COMPARTMENTS FOR PICKUP TRUCK BED

(71) Applicant: Karey N Kananda, Newman Lake, WA (US)

(72) Inventor: Karey N Kananda, Newman Lake, WA (US)

(73) Assignee: Mt Nebo Truck Systems LLC, Newman Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/700,459

(22) Filed: Mar. 21, 2022

(65) Prior Publication Data

US 2022/0212727 A1 Jul. 7, 2022

Related U.S. Application Data

(63) Continuation of application No. 16/984,142, filed on Aug. 3, 2020, now Pat. No. 11,279,420.

(60) Provisional application No. 62/881,923, filed on Aug. 1, 2019.

(51) Int. Cl.
*B60R 9/06* (2006.01)
*B62D 33/02* (2006.01)

(52) U.S. Cl.
CPC ............ *B62D 33/0207* (2013.01); *B60R 9/06* (2013.01)

(58) Field of Classification Search
CPC .............................. B62D 33/0207; B60R 9/06

USPC ......................................................... 224/404
See application file for complete search history.

(56) References Cited

U.S. PATENT DOCUMENTS

| | | | | |
|---|---|---|---|---|
| 2,784,027 A | * | 3/1957 | Temp ........................ | B60P 3/32 296/156 |
| 4,239,440 A | * | 12/1980 | James .................... | B60P 1/4435 414/542 |
| 4,369,902 A | * | 1/1983 | Lampeas .................... | B60R 9/06 224/523 |
| 4,522,326 A | * | 6/1985 | Tuohy, III ............... | B60R 11/06 224/310 |
| 4,573,731 A | * | 3/1986 | Knaack .................... | B60R 11/06 224/404 |
| 4,830,242 A | * | 5/1989 | Painter ..................... | B60P 3/32 224/42.32 |

(Continued)

*Primary Examiner* — Peter N Helvey
(74) *Attorney, Agent, or Firm* — Mark Farrell; Farrell Patent Law PC

(57) ABSTRACT

A quick-detach storage system with configurable compartments for a vehicle bed is provided. An example lightweight system has a rail member that can be quickly attached to and removed from the bed of a pickup truck by a single user standing near the pickup. A sliding member extends from the rail past the end of the tailgate of the pickup or other vehicle, allowing the user to attach and detach baskets and containers to the sliding member. The baskets and containers can then be retracted back into the pickup bed along the rail. Various containers of the system are outfitted to hold liquids, grocery items, tools, bicycles, and other objects for easy loading into the bed of the pickup, where the items remain secure. In an embodiment, multiple instances of the quick-detach storage system may be joined with each other.

20 Claims, 28 Drawing Sheets

(56) References Cited

U.S. PATENT DOCUMENTS

| | | | | |
|---|---|---|---|---|
| 4,889,377 | A * | 12/1989 | Hughes | B60P 3/14 |
| | | | | 296/3 |
| 5,088,636 | A * | 2/1992 | Barajas | B60R 9/00 |
| | | | | 224/404 |
| 5,988,722 | A * | 11/1999 | Parri | B60P 1/003 |
| | | | | 224/403 |
| 8,177,110 | B1 * | 5/2012 | Hines, Jr. | B60R 9/00 |
| | | | | 224/403 |
| 8,240,527 | B1 * | 8/2012 | Casselton | B60R 9/065 |
| | | | | 224/404 |
| 2006/0102669 | A1 * | 5/2006 | Fouts | B60R 9/00 |
| | | | | 224/404 |
| 2006/0226189 | A1 * | 10/2006 | Lussier | B60R 11/06 |
| | | | | 224/404 |
| 2009/0065543 | A1 * | 3/2009 | Bone | B60P 3/122 |
| | | | | 224/310 |
| 2013/0134733 | A1 * | 5/2013 | Peters | B60P 1/435 |
| | | | | 296/37.6 |
| 2016/0347256 | A1 * | 12/2016 | Lambert | B60R 9/06 |
| 2017/0232907 | A1 * | 8/2017 | Singer | B60P 1/6427 |
| | | | | 224/404 |
| 2020/0023784 | A1 * | 1/2020 | Flajnik | B60R 9/065 |
| 2020/0406986 | A1 * | 12/2020 | Sosnowich | B62D 33/0207 |

* cited by examiner

FRONT

BACK

Top

BOTTOM

LEFT SIDE

RIGHT SIDE

FRONT

BACK

TOP

BOTTOM

LEFT SIDE

RIGHT SIDE

QUICK-DETACH STORAGE SYSTEM WITH CONFIGURABLE COMPARTMENTS FOR PICKUP TRUCK BED

RELATED APPLICATIONS

This continuation patent application claims the benefit of priority to U.S. patent application Ser. No. 16/984,142 to Kananda, filed Aug. 3, 2020, which in turn claims priority to U.S. Provisional Patent Application No. 62/881,923 to Kananda, filed Aug. 1, 2019; both of these are incorporated by reference herein in their entireties.

BACKGROUND

Tool boxes and other storage boxes and containers are often mounted on pickup beds, but the mounting can be laborious. Such measures are usually not detachable, or when they are detachable, they are heavy to lift out of the pickup bed, and difficult to reattach when needed later. Conventional schemes are also not very flexible in their functionality: a tool chest or system of drawers in the back of a pickup is not very configurable for different uses, and not very useful for sorting items quickly.

SUMMARY

A quick-detach storage system with configurable compartments for a vehicle bed is provided. An example lightweight system has a rail member that can be quickly attached to and removed from the bed of a pickup truck by a single user standing near the pickup. A sliding member extends from the rail past the end of the tailgate of the pickup or other vehicle, allowing the user to attach and detach baskets and containers to the sliding member. The baskets and containers can then be retracted back into the pickup bed along the rail. Various containers of the system are outfitted to hold liquids, grocery items, tools, bicycles, and other objects for easy loading into the bed of the pickup, where the items remain secure. In an embodiment, multiple instances of the quick-detach storage system may be joined with each other.

An example system has small anchors that attach to walls of a vehicle bed, or has a boltless bracket that hangs over the top of the truck bed. In an implementation, once seated on anchors, or on the walls of the pickup bed, the rail member is secured in hanging from its brackets, or in some versions can be secured by turning the knob of a simple screw clamp. Baskets and containers of various sorts attach to the rail. The containers may hold a liquid or a bicycle, for example. In an implementation, a sliding part of the rail member can extend out past the tailgate of the vehicle, bringing the carried or stored items out to the user.

This summary is not intended to identify key or essential features of the claimed subject matter, nor is it intended to be used as an aid in limiting the scope of the claimed subject matter.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

In the Figures, the shown parts are not necessarily to scale, and not necessarily in scale with regards to relative sizes and relative thicknesses of adjacent parts. Rather, the components of the Figures are sized and scaled relative to each other for purposes of description.

DETAILED DESCRIPTION

Overview

This disclosure describes quick-detach storage systems with configurable compartments for pickup truck beds.

Figure 1:
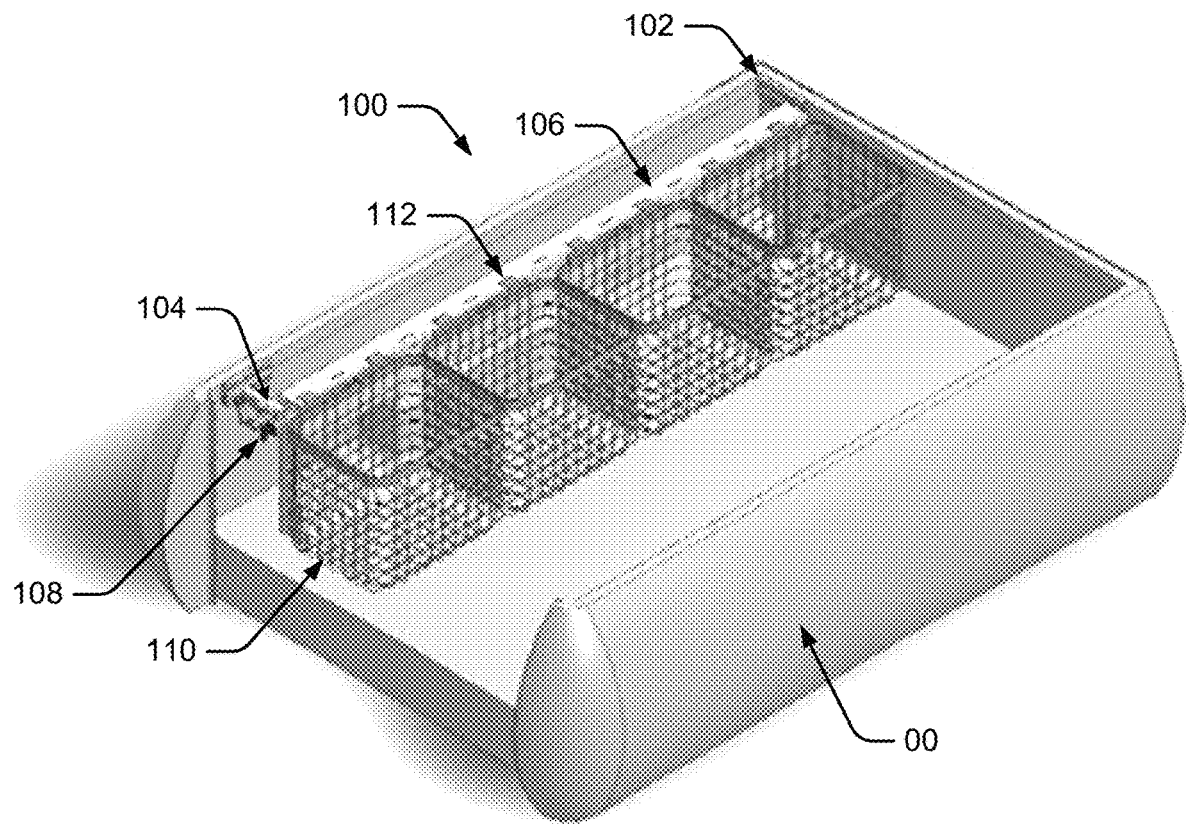
FIG. 1 is a diagram of an example quick-detach storage system for a vehicle bed.

FIG. 1 shows an example pickup truck bed 00, with the quick-detach storage system 100 installed on the left (driver's) side of the vehicle. A relatively small anchor 102 or fastener is attached to the front wall of the pickup bed 00. A rear anchor 104 is attached to the side of the pickup truck bed 00 to receive the system 100. The system 100 may be installed on either the left side or the right side of the pickup bed 00, or two systems 100 may be installed, one on each side.

Anchors 102 and 104 may be attached by various fastening means, depending on the particular pickup truck bed 00 and the version of the quick-detach system 100 to be used. For example, one or both of the anchors 102 & 104 may be attached by metal screws or bolts. The anchors 102 & 104 may also be attached by permanent adhesive or by magnets, such as powerful neodymium magnets. In an implementation, a relatively flat part of an anchor 102 and/or 104 to be fastened to the bed of the truck is permanently attached as a hanger or base for the remainder of the anchor 102 and/or 104, so that the part of each anchor 102 and/or 104 that sticks out from the respective wall of the pickup bed 00 can also be removed with the rest of the example system 100. This arrangement provides permanently attached bases for the anchors 102 & 104, while allowing the system 100, including the bulk of the anchors 102 & 104, to be quickly detached from the vehicle. When the system 100 is detached, the permanently attached bases for the anchors 102 & 104 are flush, or almost flush with the wall surfaces of the pickup bed 00, leaving no projections remaining that would impede loading or other use of the pickup bed 00.

In an implementation, one or both of the anchors 102 & 104 have a small footprint of approximately 2.5 inches×3.5 inches. In another implementation, one or both of the anchors 102 & 104 have a larger fastening surface, for example, the anchors 102 & 104 may be attachable via a larger flat member of 2.5 inches×6-8 inches. In yet another implementation, the anchors 102 & 104 may both be attached to a single large "L" shaped member, which in turn is attached as a single piece to the bed 00 of the pickup truck of other vehicle. All of these embodiments of the anchors 102 & 104 may be attached to the bed 00 of the pickup by metal screws, bolts, adhesives, magnets, and so forth.

In an implementation, a first end of a long rail member 106 attaches at the far end of the pickup bed 00 onto the anchor 102. Attachment of the rail member 106 into or onto the anchor 102 may consist of inserting a shaped end into a U-channel, one or more vertical pegs into a surface of horizontal holes, horizontal pegs into holes, one or more hooks into hangers or catches, and so forth, each of these also a quick-detach mechanism. The attachment of the first end of the long rail 106 to the anchor 102 is "remote," which means that a user at the tailgate-end of the pickup bed 00 can extend the rail 106 to the far anchor 102 and make the attachment, without being near the anchor 102 and without requiring a hands-on attachment at the location of the far anchor 102.

The second end of the long rail member 106 attaches to the near anchor 104 to secure the rail 106 to the pickup bed 00. To secure or lock the rail 106 to the near anchor 104, a clasp that closes, a screw knob 108, hasp, lever, bolt, or other securing mechanism may be used. Each securing mechanism is also a quick-detach mechanism. Once the second end of the long rail 106 is attached and secured to the near anchor 104, the rail 106 is ready in turn to use for securing baskets 110 or other containers with the pickup truck bed 00.

The rail 106 may include slots, holes, and/or other attachment mechanisms 112 for removable attachment of baskets 110 or other containers that have a complementary attachment mechanism to the attachment mechanisms 112 built into the long rail 106. A given basket 110 or other container may be attached at any available position along the rail 106. Multiple baskets 110 or other containers may be attached to the rail 106 at once.

Baskets 110 of different sizes and of different types may be attached to the same rail member 106 as space and geometry allow. Baskets 110 or other containers may be open or lidded, and lidded containers or baskets 110 may be lockable. A given container with attachment 112 to the rail member 106 may be a vessel for liquids. Baskets 110 and containers may also rise to a vertical height higher than the rail member 106, and may have a size that uses any fraction of the total length of the rail member 106, having a number of attachments 112 appropriate for the basket 110 or container, and its projected contents and weight. Baskets 110 with front sides that are lower than the other sides of the baskets 110 may be used to easily hold tubs, toolboxes, and other items or contains to be placed in the baskets 110.

Figure 2:
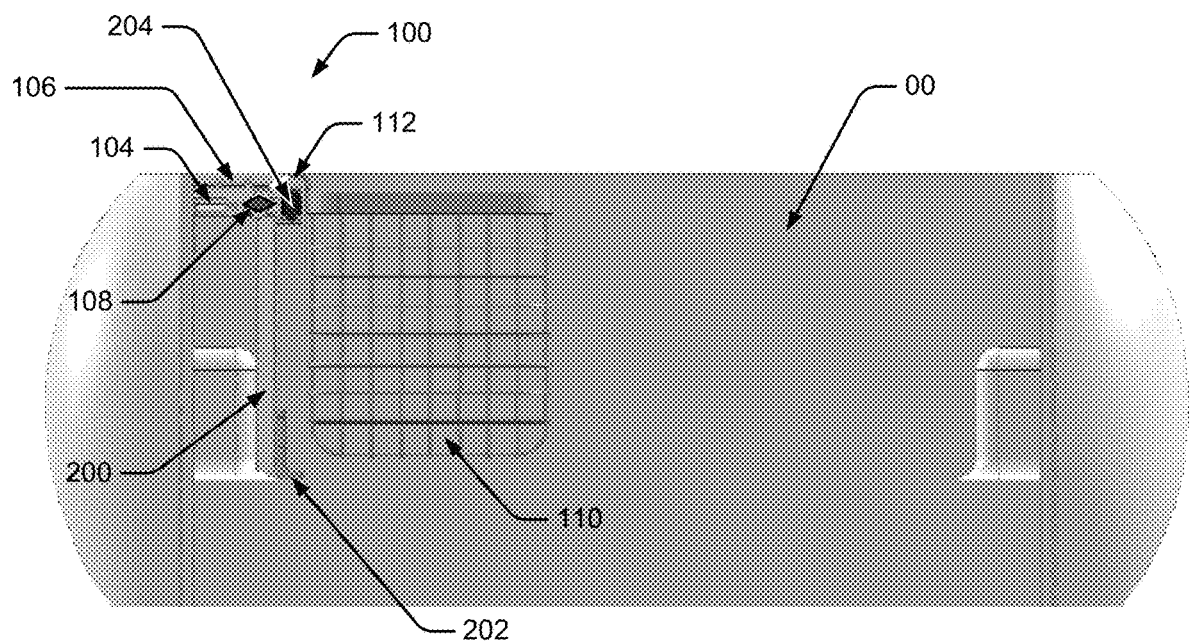
FIG. 2 is an end view of the example quick-detach storage system.

FIG. 2 shows an end view of the pickup bed 00, with a rear view of the example quick-detach storage system 100. The near anchor 104, at the rear of the pickup bed 00, may be supported by an optional upright vertical support 200 when needed in a given embodiment. The upright support 200 may be fastened or anchored in turn to the bottom surface of the pickup bed 00 by a stabilizer or cleat 202. An upright support 200 may also be used at other places along the rail 106, such as against the wheel well protuberance, or multiple upright supports 200 may be used at anchors 102 & 104 or along the rail 106.

A given basket 110 or other container may hang from its attachment 110 to the rail 106 without touching the bottom of the pickup bed 00, or the basket may be secured by its attachment 110 to the rail 106 and also rest on the bottom of the pickup bed 00. When the basket 110 has attachment 112 to the rail 106 and hangs in midair by this attachment 112, a spacer 204 or cushion may maintain the disposition of the basket 110 in relation to the rail 106 and the attachment 112.

In an implementation, the knob 108 secures the rail 106 to the rear (near) anchor 104. In one embodiment, the knob 108 may also release a sliding part of the rail 106 for extension, as shown below in FIG. 4.

Figure 3:
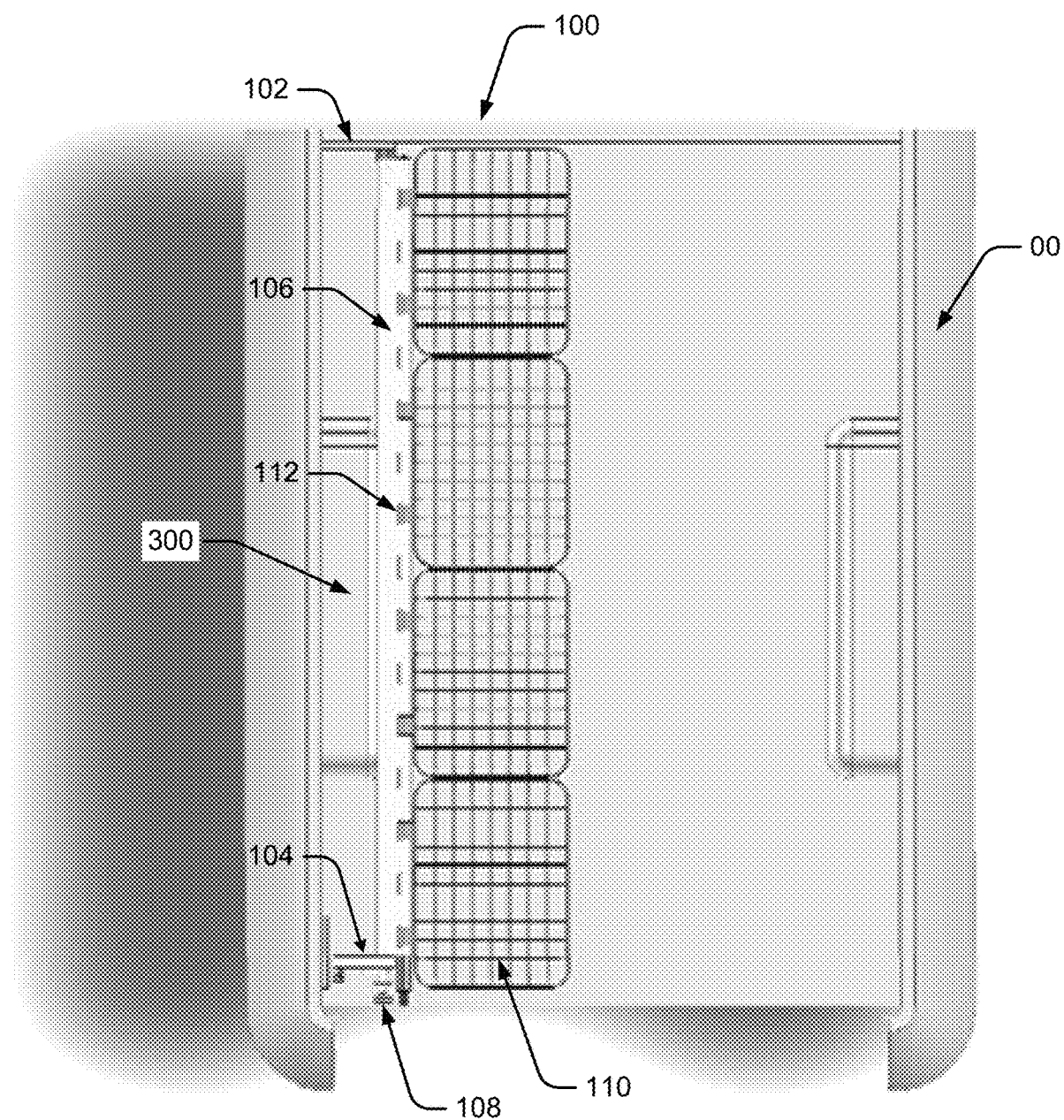
FIG. 3 is a top view of the example quick-detach storage system.

FIG. 3 shows a top view of the example pickup bed 00, including the example quick-detach storage system. Anchors 102 & 104 may be permanently attached to the pickup bed 00, or may be partly detachable, as above. The rail member 106 quickly attaches to the anchors 102 & 104 and may be secured by tightening a screw clamp or other securing mechanism, as tightened by the knob 108, for example. Baskets 110, or other containers, can be attached to the rail member 106 by various forms of attachment 112, such as by hook, clasp, and/or various types of hanger members. The baskets 110 may hang from the rail member 106, or may attach to the rail member 106 and also sit on the bed 00 of the pickup. When hanger members are used for attachment 112 of the baskets 110 to the rail member 106, then the baskets 110 can be tilted slightly to be lifted off the rail 106. The baskets 110 can then be portable for the user and mobile away from the pickup or other vehicle. The baskets 110 or other containers may have handles or other carrying features for their use away from the quick-detach storage system 100.

Figure 4:
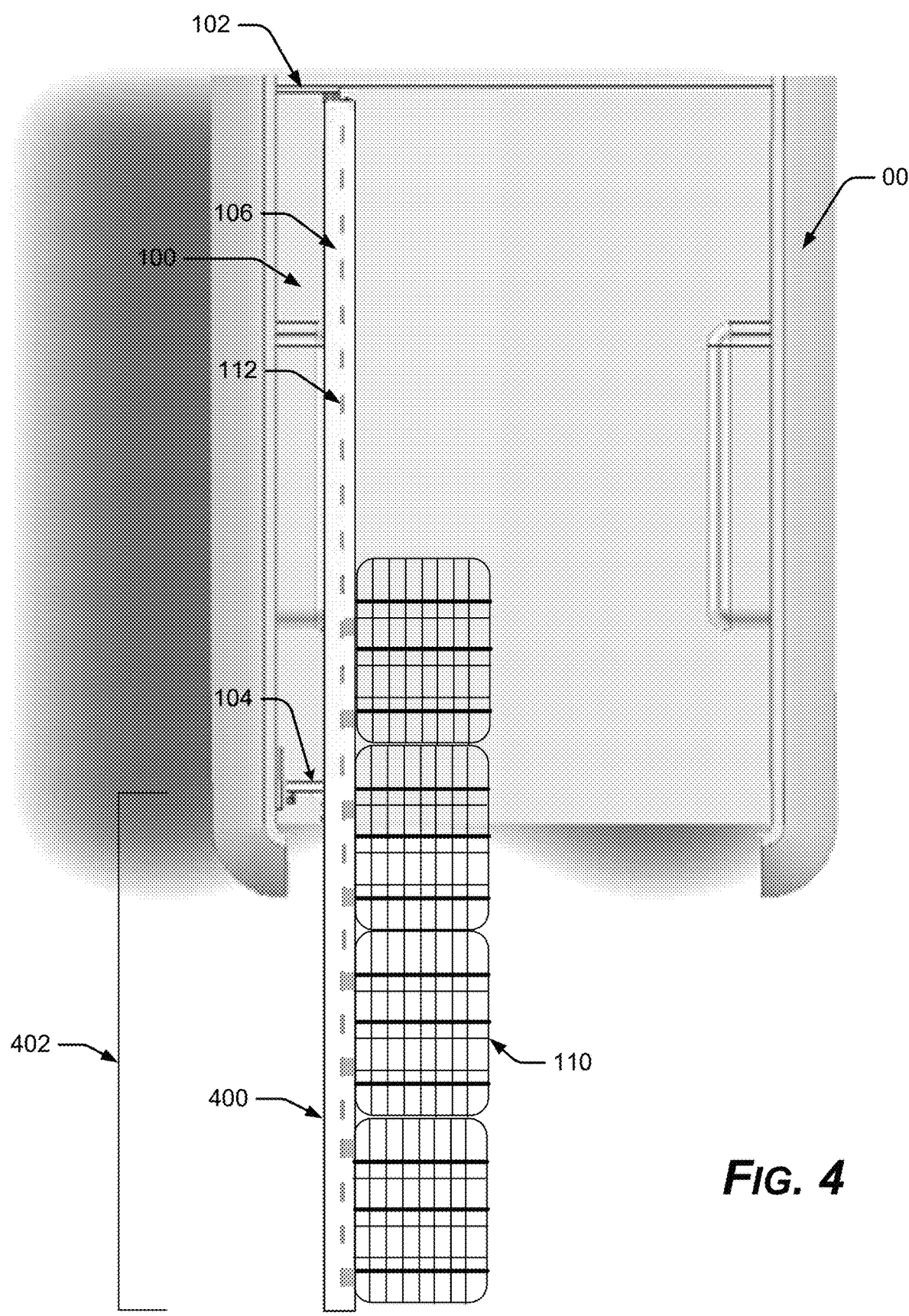
FIG. 4 is a diagram of an example slidable rail member of the example quick-detach storage system, capable of bringing the baskets out to the user.

FIG. 4 shows another top view of the example pickup bed 00, and also shows the quick-detach storage system 100 with a sliding member 400 of the long rail 106 extended out past the end of the pickup bed 00. The extended rail 402 enables quick attachment of hanging baskets 110 or other containers onto the rail 106, without the user getting into the pickup bed 00 to do so, and without having to reach far into the pickup bed 00 to place baskets 110 or other containers on far attachment points 112 on the rail 106. In this implementation, the user can attach baskets 110 or other containers to the extended sliding member 400 and then retract the sliding member into the pickup bed 00, and secure the rail 106 and the baskets 110 by tightening the knob 108 again. In one embodiment, the sliding member 400 can slide out to an additional ¾ of the length of the rail member 106, i.e., the length of the rail member 106 when the sliding member 400 is retracted into or onto the rail member 106.

In an implementation, the sliding member 400 of the rail member 106 is motorized to extend and retract. Control button or a controller allow the user to extend and retract the sliding member 400, especially to extend the sliding member 400 for bringing baskets 110 from the out-of-reach end of the pickup bed 00 to the user at the tailgate, or for enabling the user to retract the sliding member 400 to transport the baskets 110 being attached or filled with items at the tailgate to the remote part of the pickup bed 00 behind the cab.

The quick-detach storage system 100 can be quickly removed from the bed 00 of the pickup truck or other vehicle by one person. The user simply unscrews the knob 108 or releases an alternative securing mechanism at the rear anchor 104, and lifts the rail member 106 off the anchors 102 & 104 for removal.

Figure 5:
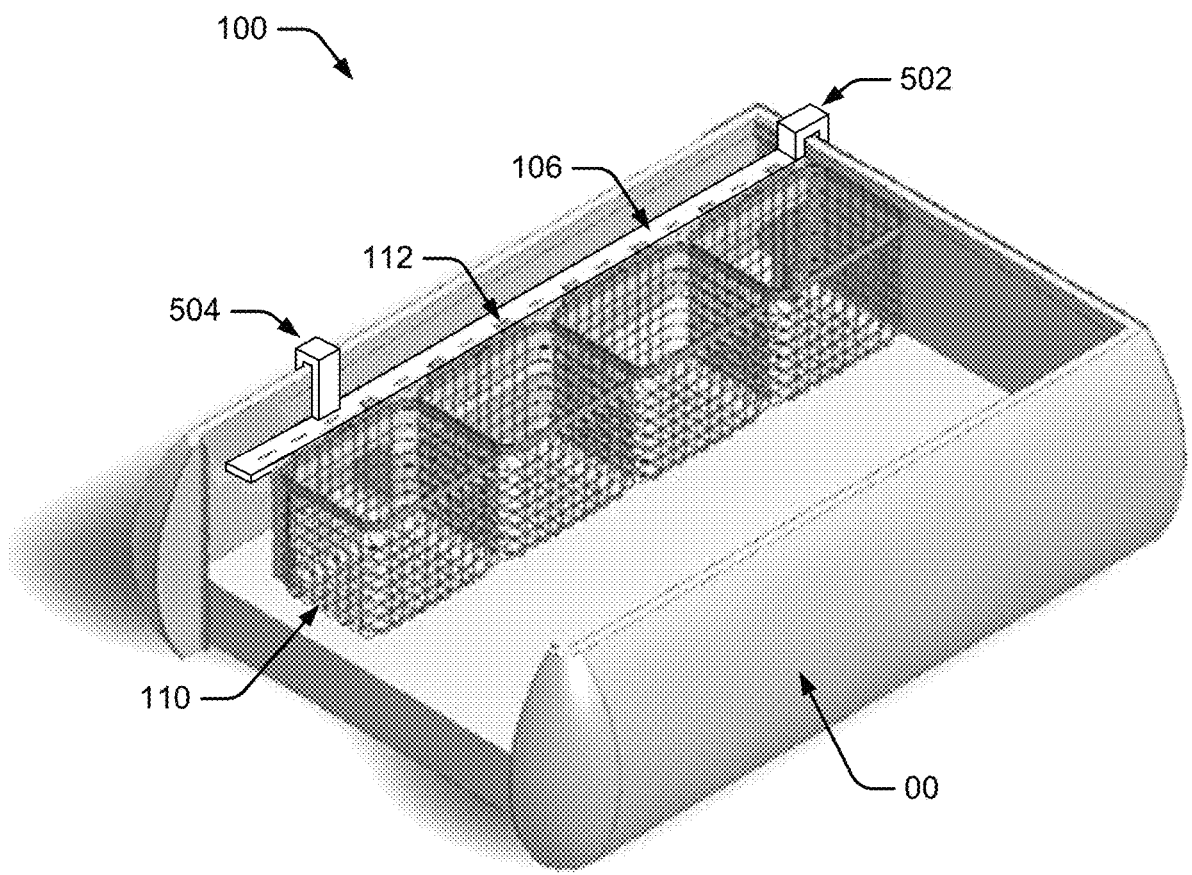
FIG. 5 is a diagram of the example quick-detach storage system with nonintrusive boltless attachment mechanism for attaching to the bed of a pickup truck.
Figure 5:
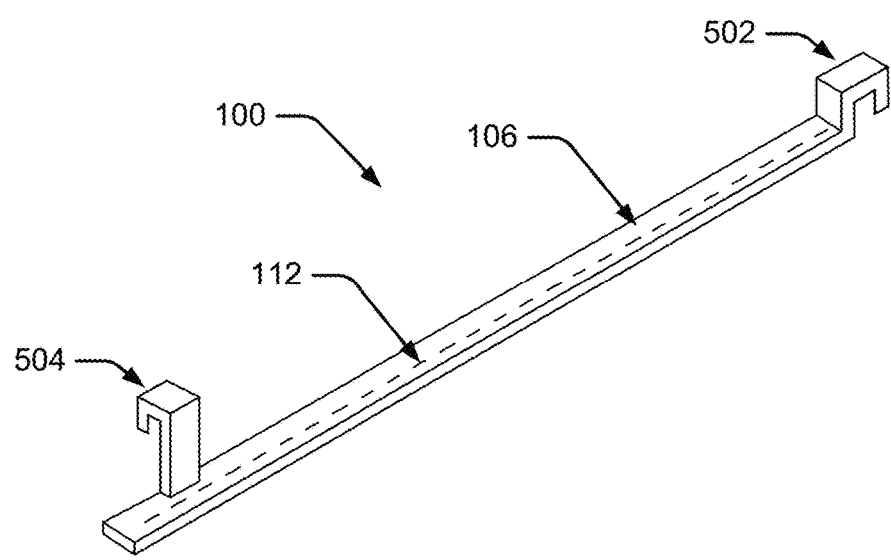

FIG. 5 shows another example version of the quick-detach storage system 100. An end hanging bracket, such as an L-shaped end bracket 502 sits on the top of the end wall of the pickup bed 00. The L-shaped end bracket 502 can have different configurations suitable for attaching on or over the particular end wall of the pickup truck bed 00. The L-shaped end bracket 502 is boltless, and requires no additional attachment mechanism, or intrusion into the end wall of the pickup bed 00, such as drilled hole and so forth.

A given implementation of the quick-detach storage system 100 may also have a side L-shaped bracket 504 to fit on or over a side wall of the pickup truck bed 00. The system 100 may have one or both of the end L-shaped bracket 502 and/or the side L-shaped bracket 504. Dimensions of the L-shaped brackets 502 & 504 depend on the particular pickup truck bed 00. When the quick-detach storage system 100 has both end and side L-shaped brackets 502 & 504, then no other clamp (108) or securing mechanism is needed.

The example quick-detach storage system 100 with L-shaped brackets 502 & 504 can lift off the pickup truck bed 00 simply by the user lifting up the rail member 106 to lift the L-shaped bracket(s) 502 and/or 504 off the walls of the pickup bed 00.

Figure 6:
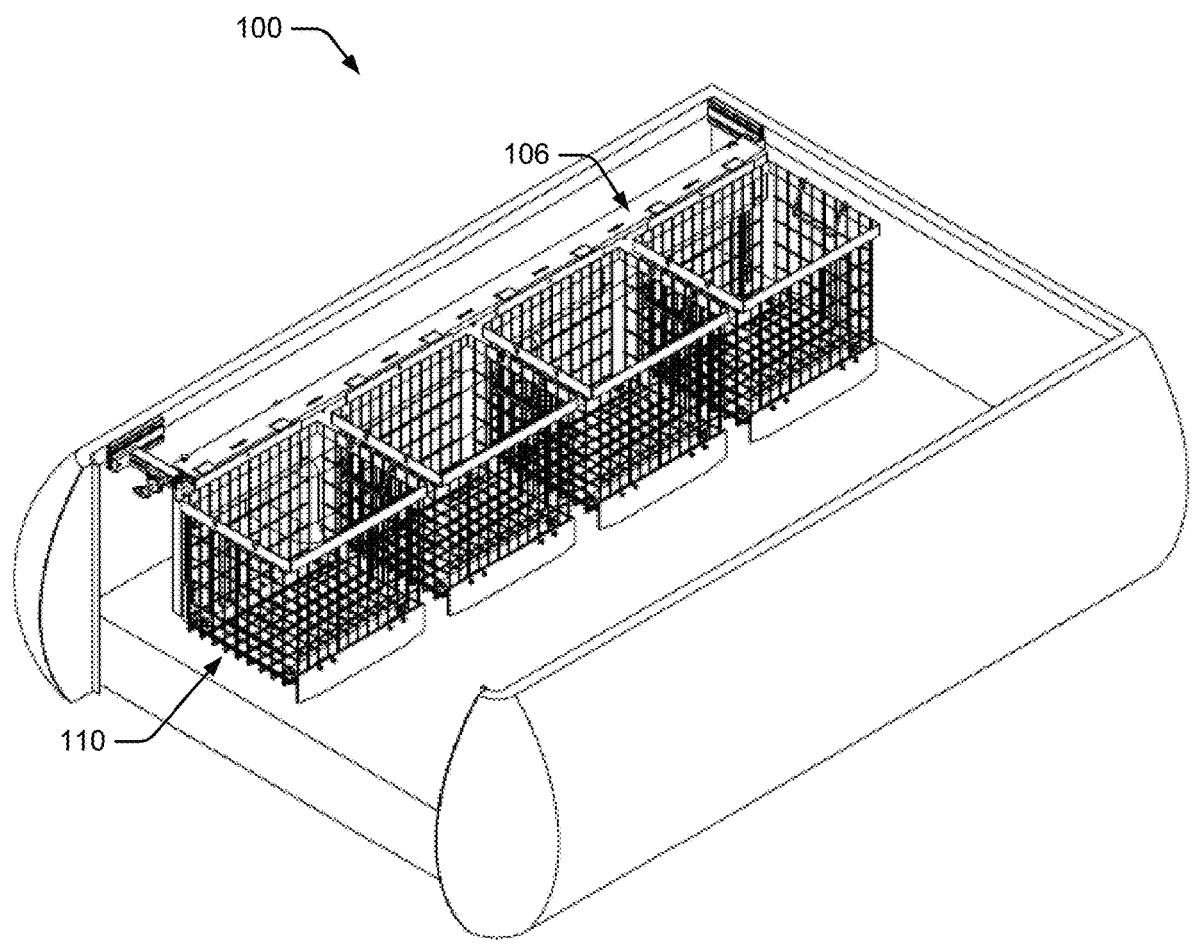
FIG. 6 is a diagram of the example quick-detach storage system with rail extension closed.

FIG. 6 shows the example quick-detach storage system 100 attached to the pickup truck bed 00 with attachments to one or more wall of the pickup truck bed 00. The rail 106 is retracted, with each basket 110 inside the bed of the vehicle. The assembly 100 is in the closed position or state.

Figure 7:
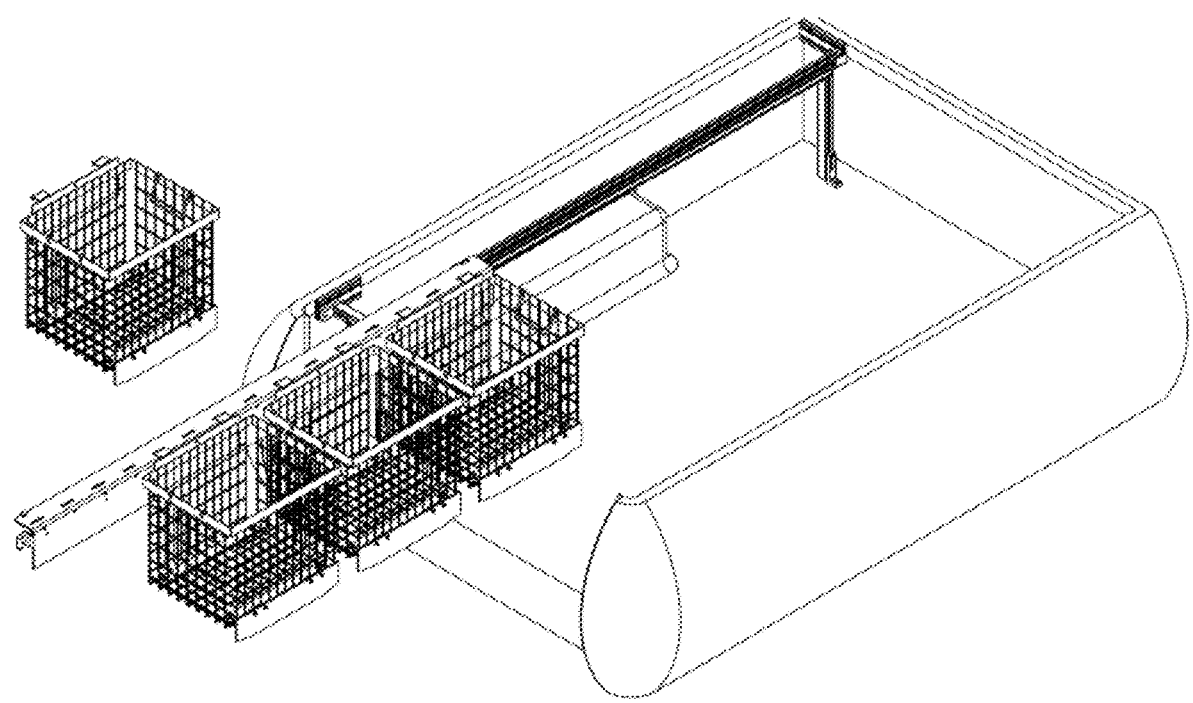
FIG. 7 is a diagram of the example quick-detach storage system with rail extension open, and with a basket removed from the rail member.

FIG. 7 shows the example quick-detach storage system 100 of FIG. 6, with the rail in the extended position. One of the baskets is removed. The removed basket can be ported by hand for use away from the example storage system 100. In an implementation, the baskets or other containers hang from the rail by gravity, and are not required to rest on the bed of the vehicle. In another implementation, the baskets may also rest on the bed of the vehicle for a higher weight capacity.

Figure 8:
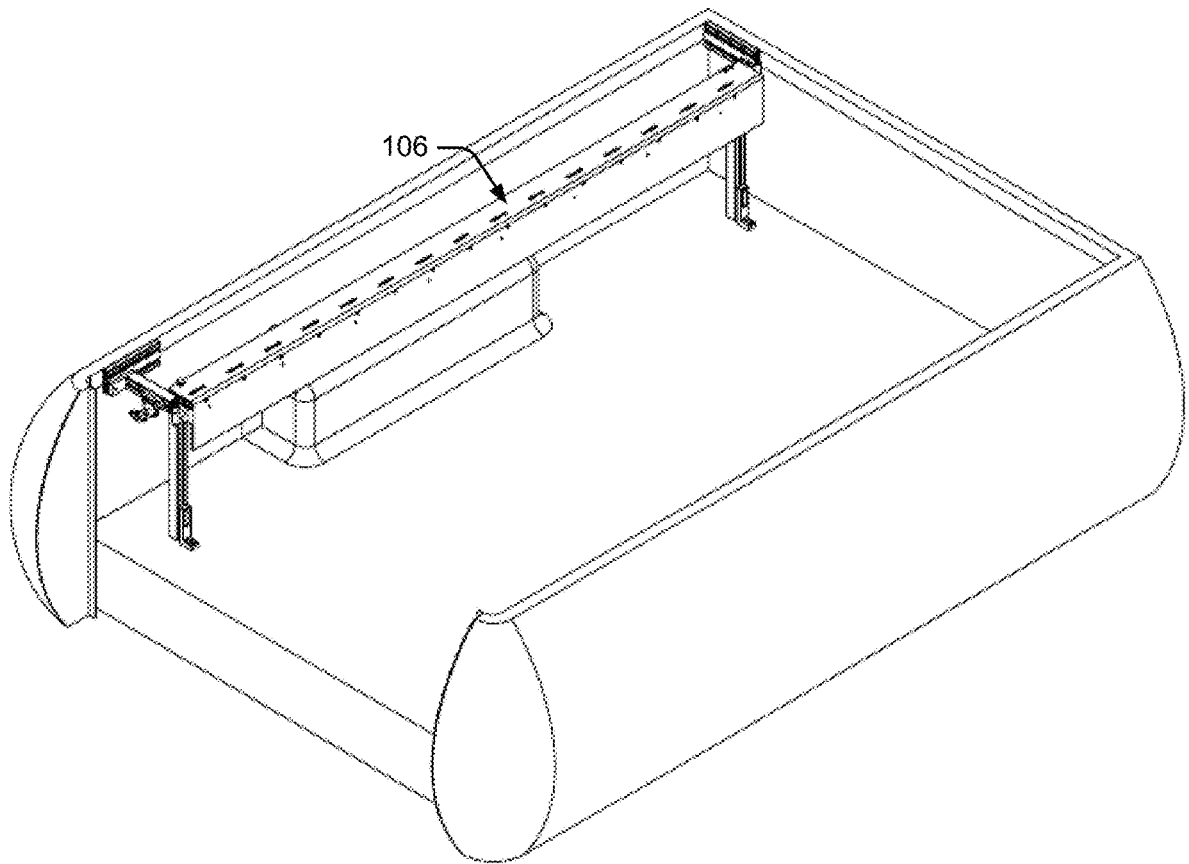
FIG. 8 is a diagram of the example quick-detach storage system showing optional upright supports.

FIG. 8 shows the storage system 100 of FIG. 6 with baskets 110 removed from the rail 106.

Figure 9:
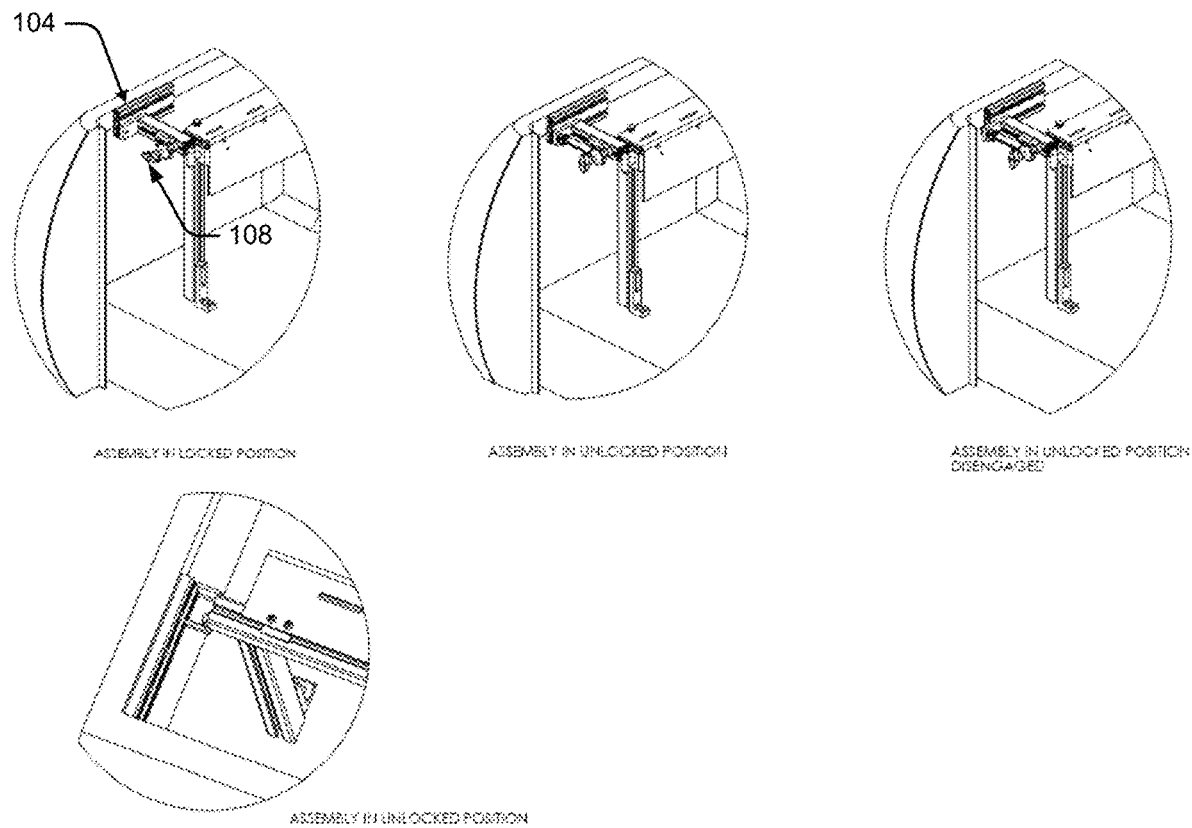
FIG. 9 is a diagram of the example quick-detach storage system showing an end anchor in locked and unlocked positions.

FIG. 9 shows the storage system 100, of FIG. 1 for example, with the end anchor 104 and a securing mechanism with screw knob 108 in various engaged and disengaged positions, and various locked and unlocked states.

Figure 10:
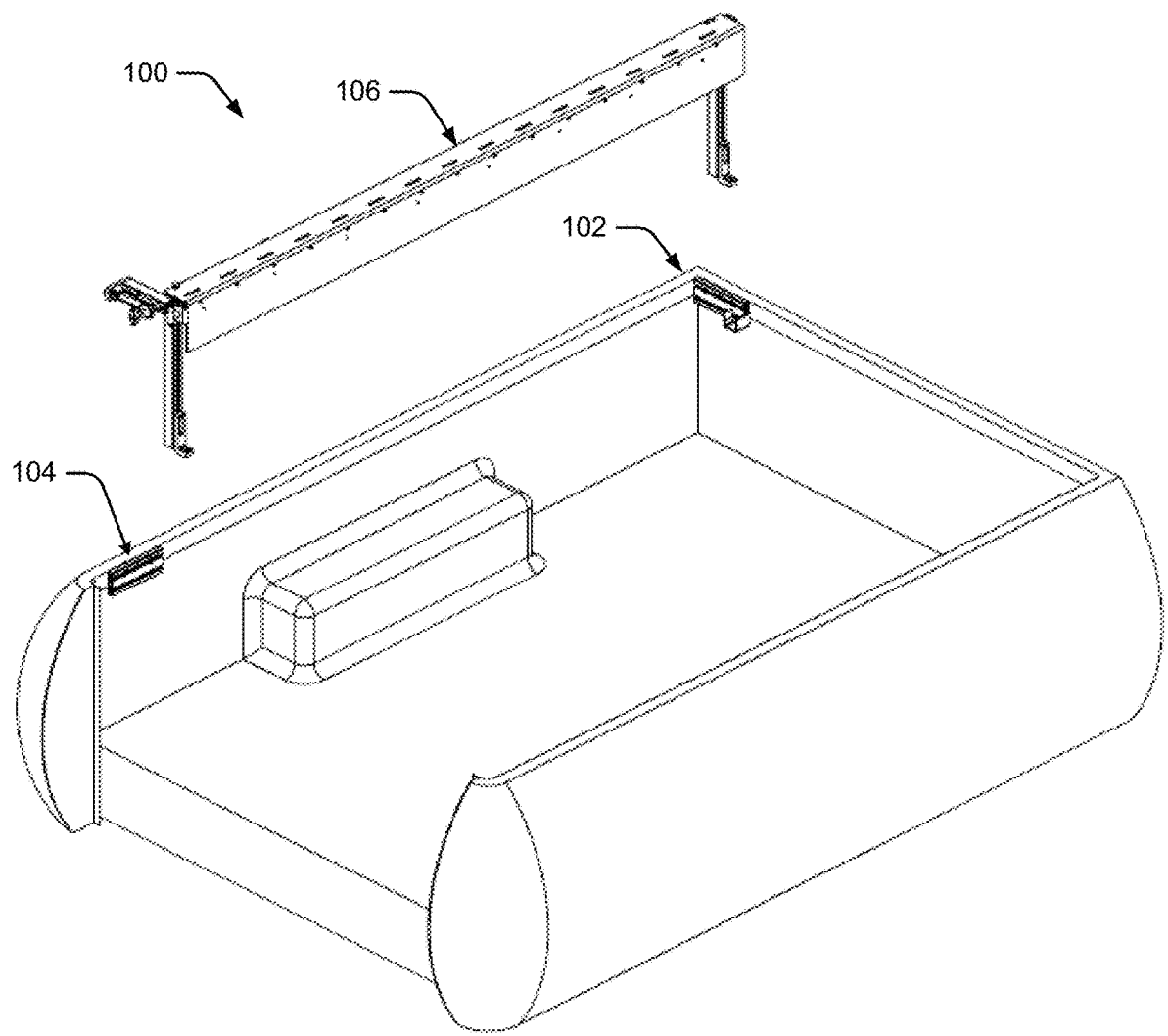
FIG. 10 is a diagram of the example quick-detach storage system showing quick-detachment of the rail member from anchors.

FIG. 10 is a diagram of the example quick-detach storage system showing quick-detachment of the rail member 106 from anchors. In an implementation, each anchor for the rail has a base member 1002, 1004 that remains attached to the bed of the vehicle. The base members 1002, 1004 may be flat or flush with surfaces of the bed of the vehicle. The remaining parts of the anchors, which stay with the removed rail 106, may attach to the base members 1002, 1004 without tools. This may be accomplished by sliding into channels or grooves on the base members 1002, 1004, for example.

Figure 11:
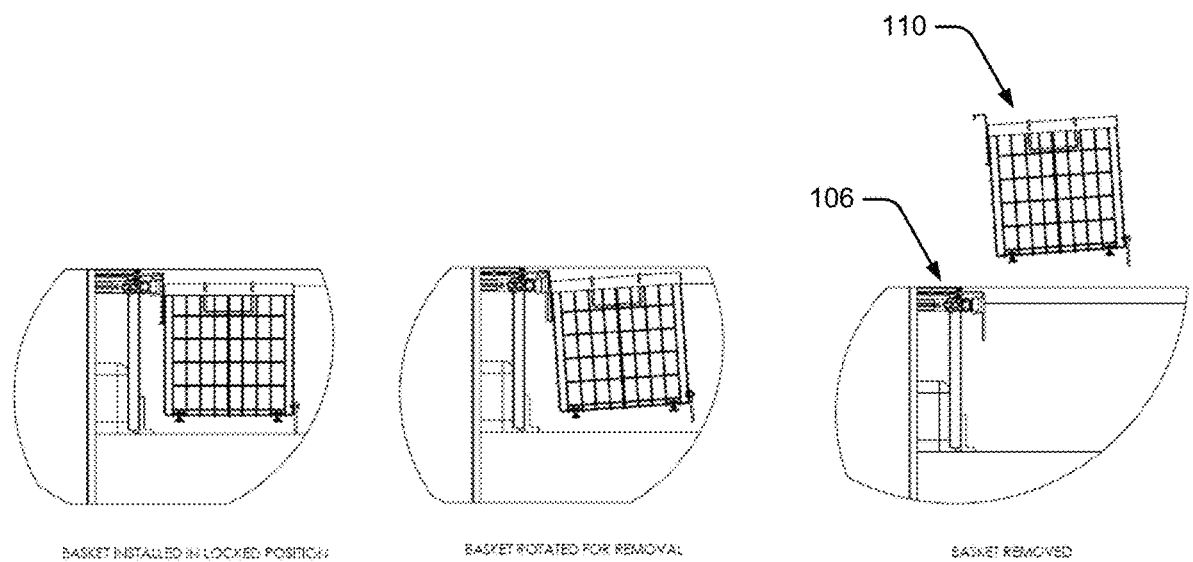
FIG. 11 is a diagram of the example quick-detach storage system showing basket attachment and removal.

FIG. 11 is a diagram of the example quick-detach storage system 100 showing one technique for removing a basket 110 from the rail 106.

Figure 12:
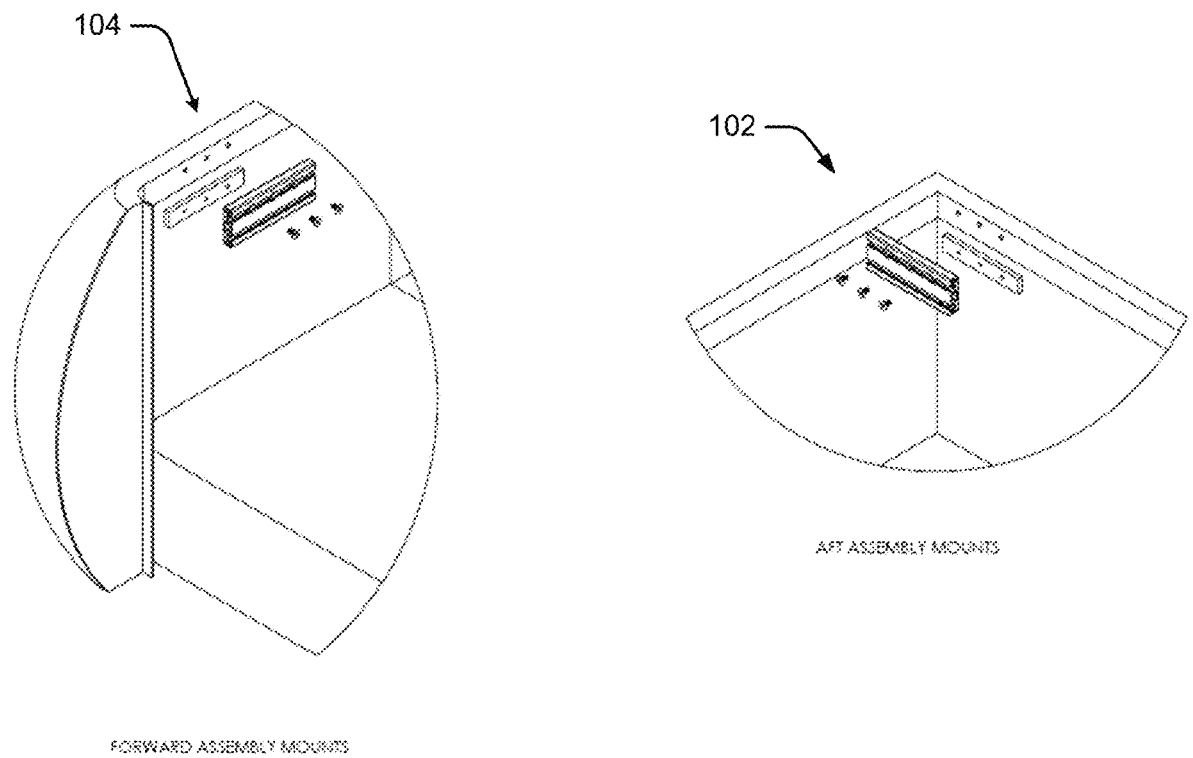
FIG. 12 is a diagram of the example quick-detach storage system showing one example anchor attachment technique.

FIG. 12 is a diagram of the example quick-detach storage system 100 showing one example anchor attachment technique.

Figure 13:
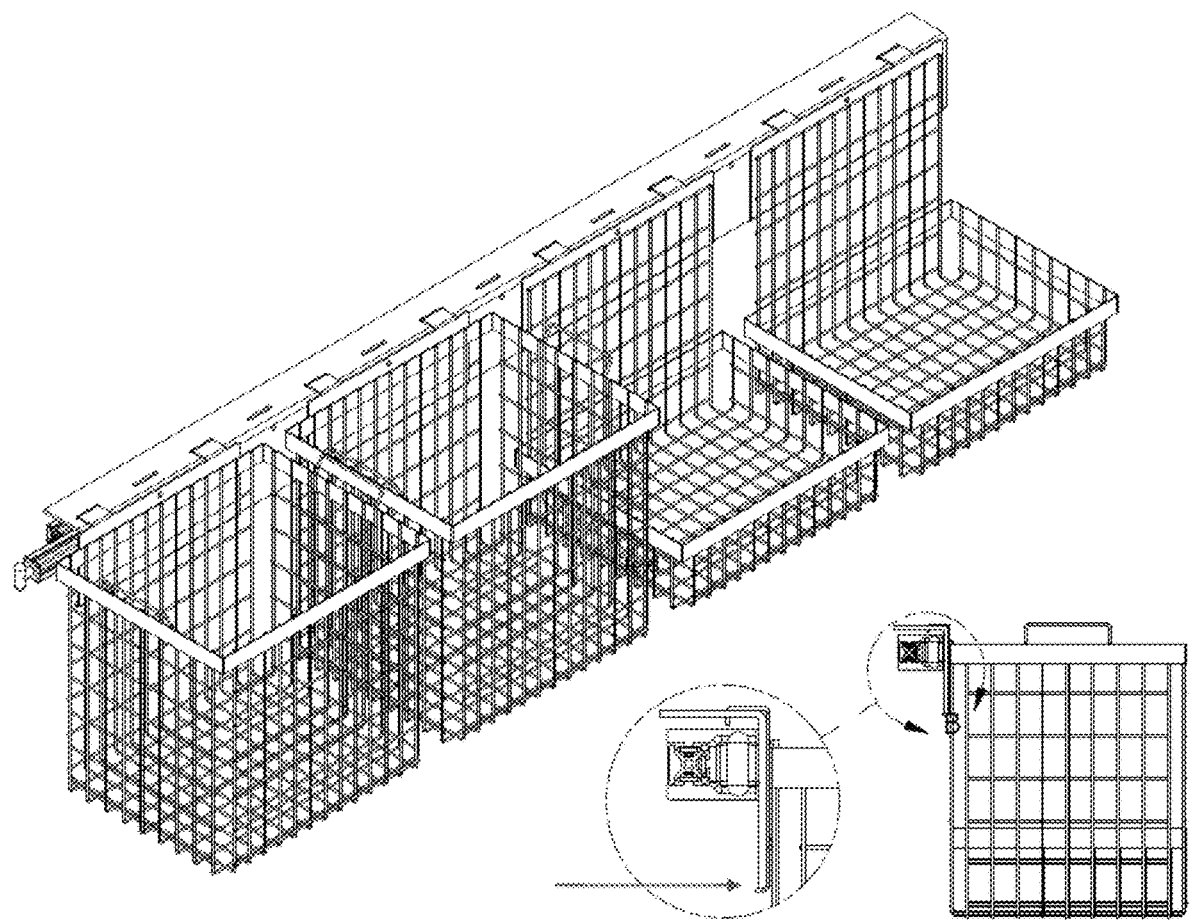
FIG. 13 is a diagram of the example quick-detach storage system showing basket attachment detail and support.

FIG. 13 is a diagram of the example quick-detach storage system showing basket attachment detail and support.

Figure 14:
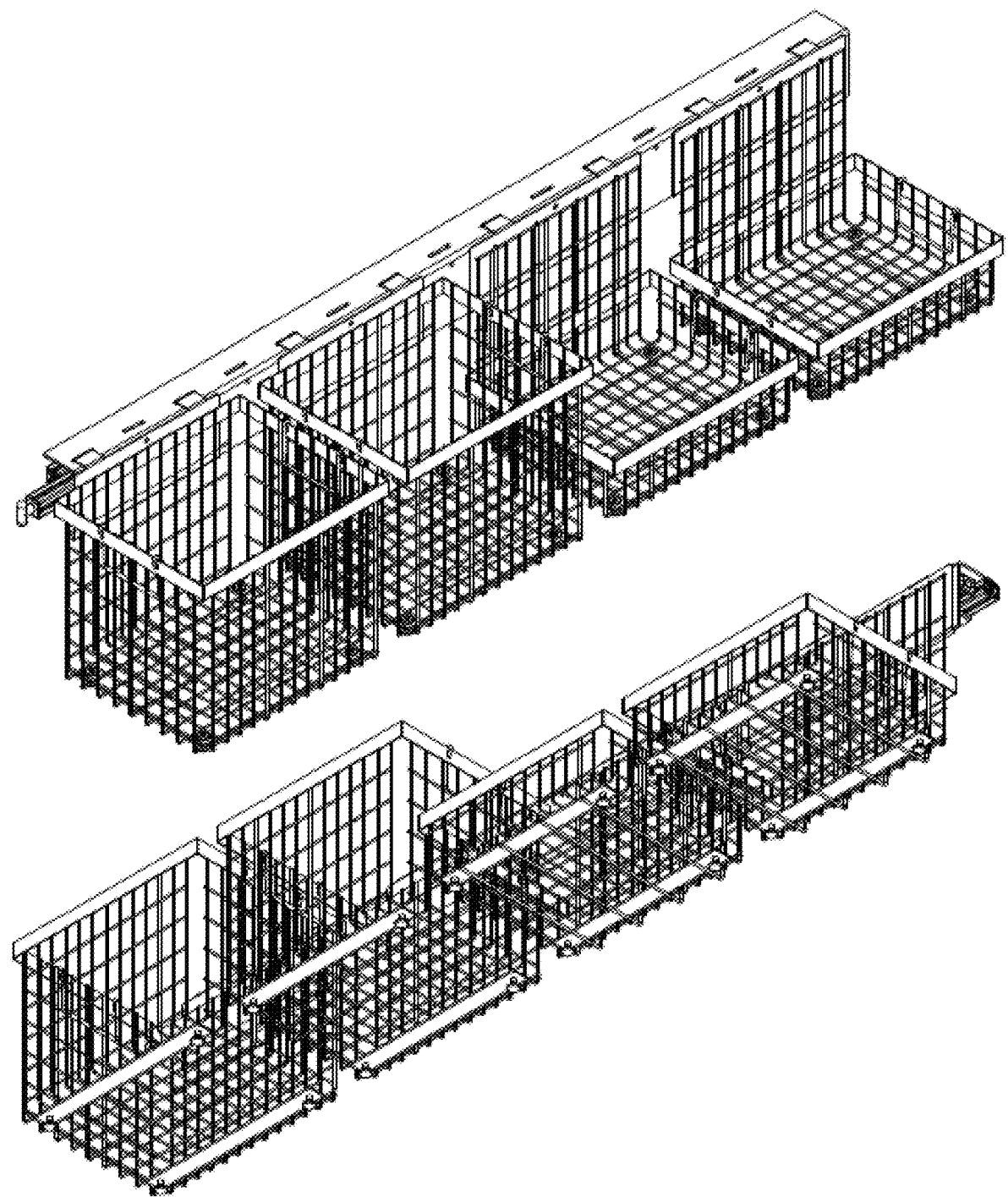
FIG. 14 is a diagram of the example quick-detach storage system showing use of a variety of mixed baskets.

FIG. 14 is a diagram of the example quick-detach storage system showing use of a variety of mixed baskets 110 of various sizes and shapes.

Figure 15:
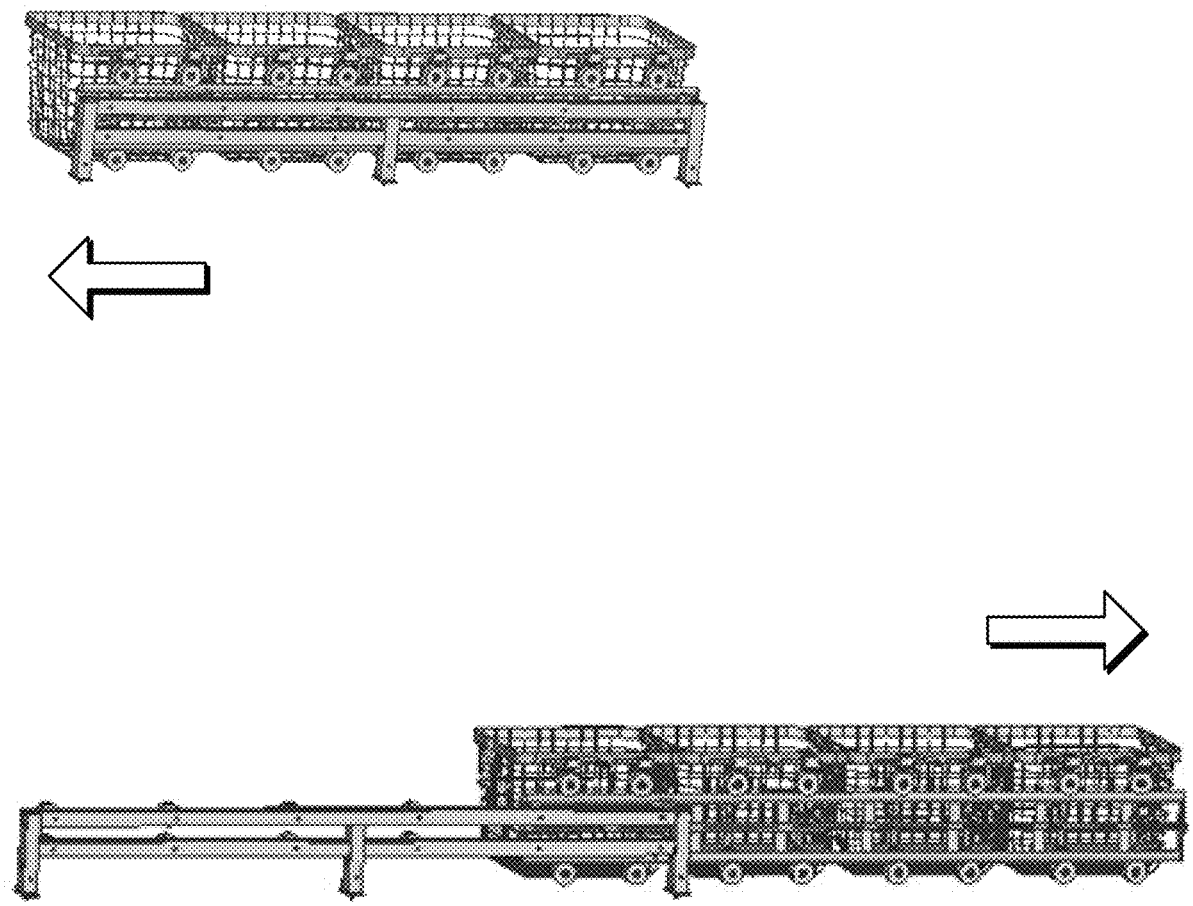
FIG. 15 is a diagram of the example quick-detach storage system with dual telescopic slide rails or double rail rollers for movement of a sliding member, shown retracted and extended.

FIG. 15 is a diagram of the example quick-detach storage system with dual telescopic slide rails or double rail rollers for movement of a sliding member, shown retracted and extended. FIG. 15 illustrates an example storage and carrying system capable of carrying heavy weight. FIG. 15 shows the example storage system 100 retracted, and extended.

The storage system 100 may have a sliding member of the rail member, the sliding member capable of carrying the at least one basket or container. The sliding member is capable of extending from the rail member past an end of the vehicle bed to carry the at least one basket or container past the end of the vehicle bed. The sliding member can be capable of extending from the rail member past the end of the vehicle bed for a distance of three-fourths a length of a retracted state of the rail member and sliding member.

The rail member may have dual telescopic slide rails or double rail rollers for movement of the sliding member relative to the rail member. The dual rails or double horizontal rows of rail rollers provide a heavy duty implementation of the example storage system 100. The sliding member can comprise a lower rail, and an upper rail disposed vertically above the lower rail, wherein the lower rail and the upper rail are incorporated into the dual telescopic slide rails or the double rail rollers for movement of the sliding member relative to the rail member.

The rail member may further have a first horizontal row of rollers in contact with a top surface of the lower rail of the sliding member and a second horizontal row of rollers in contact with a bottom surface of the upper rail of the sliding member.

In an implementation, at least one basket or container comprises a lower roller to engage a bottom surface of the lower rail of the sliding member and an upper roller to engage a top surface of the upper rail of the sliding member.

The lower roller and the upper roller of the basket or container can be a removable attachment to the sliding member of the rail member. The lower roller and the upper roller of the basket or container enables the basket or container to move horizontally along the sliding member.

The basket or container can be a rack for a bicycle, moped, or motorcycle. In this case, a first container attachable to the rail member or to the sliding member is an apparatus or mechanism for securing a front tire of the bicycle, moped, or motorcycle and a second container attachable to the rail member or sliding member secures a rear tire of the bicycle, moped, or motorcycle. The first side of the bike rack and the second side of the bike rack can moving independently of each other along the sliding member or the rail member to accommodate and secure different sizes of two-wheeled vehicles.

In an implementation, the rail member and sliding member may have a motor or solenoid to extend and retract the sliding member with respect to the rail member.

Figure 16:
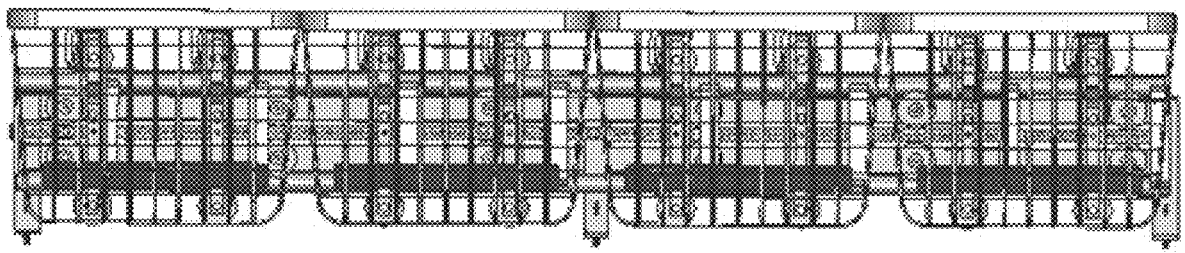
FIG. 16 is a front view of the example quick-detach storage system shown in FIG. 15.

FIG. 16 is a front view of the example quick-detach storage system shown in FIG. 15.

Figure 17:
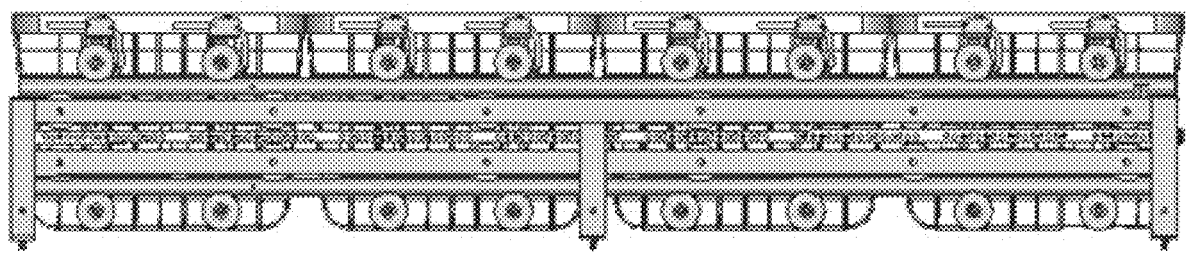
FIG. 17 is a rear view of the example quick-detach storage system shown in FIG. 15.

FIG. 17 is a rear view of the example quick-detach storage system shown in FIG. 15.

Figure 18:
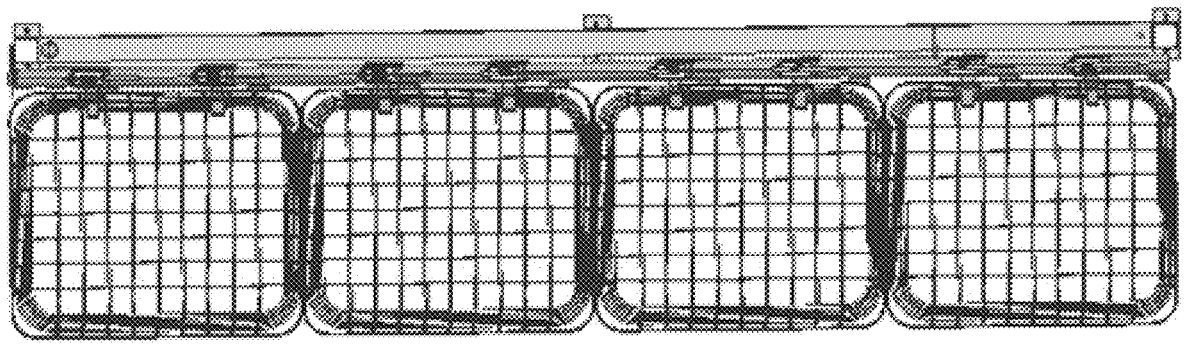
FIG. 18 is a top view of the example quick-detach storage system shown in FIG. 15.

FIG. 18 is a top view of the example quick-detach storage system shown in FIG. 15.

Figure 19:
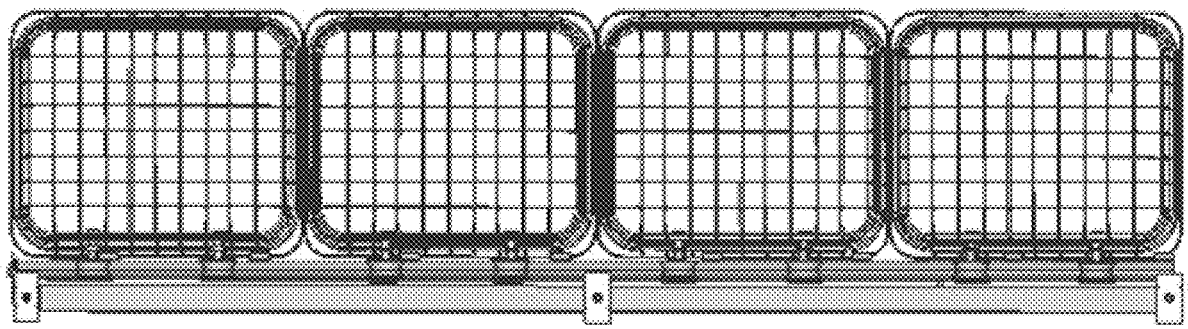
FIG. 19 is a bottom view of the example quick-detach storage system shown in FIG. 15.

FIG. 19 is a bottom view of the example quick-detach storage system shown in FIG. 15.

Figure 20:
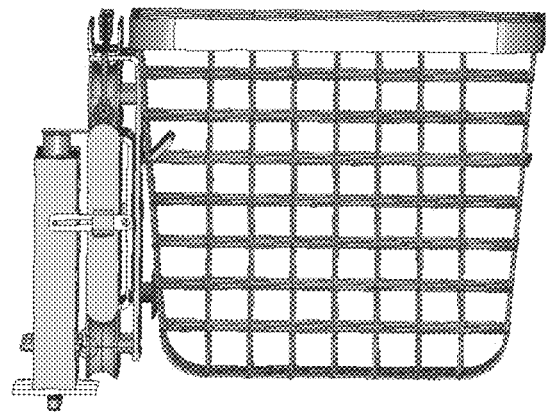
FIG. 20 is a left side view of the example quick-detach storage system shown in FIG. 15.

FIG. 20 is a left side view of the example quick-detach storage system shown in FIG. 15.

Figure 21:
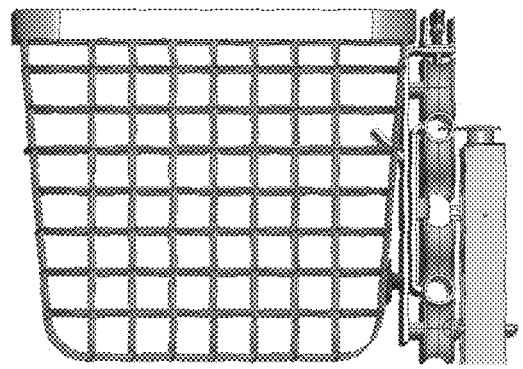
FIG. 21 is a right side view of the example quick-detach storage system shown in FIG. 15.

FIG. 21 is a right side view of the example quick-detach storage system shown in FIG. 15

Figure 22:
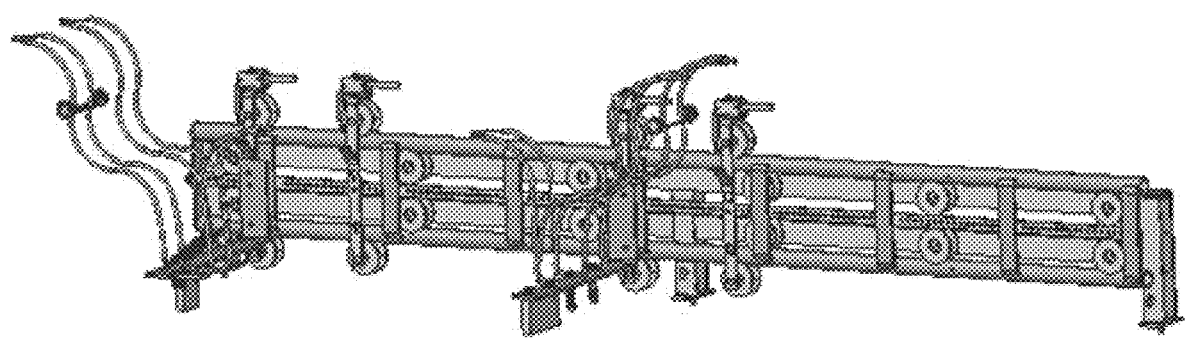
FIG. 22 is a diagram of an example storage system for a vehicle bed with components for securing a bicycle, moped, or motorcycle.

FIG. 22 shows the example storage system 100 with components providing a bike rack for securing and carrying a bicycle, moped, or motorcycle. The dual rail slide system or roller system enables the user to slide the bicycle, moped, or motorcycle into and out of the bed of the vehicle without lifting anything, and without having to enter or climb onto the bed of the vehicle.

The baskets or containers in this implementation can constitute a rack for securing one or more bicycles, mopeds, or motorcycles. In this case, the first "container" attachable to the rail member or to the sliding member is an apparatus or mechanism for securing a front tire of the bicycle, moped, or motorcycle and a second container attachable to the rail member or sliding member secures a rear tire of the bicycle, moped, or motorcycle. The first side of the bike rack and the second side of the bike rack can move independently of each other along the sliding member and/or the rail member to accommodate and secure different sizes of two-wheeled vehicles.

In an implementation, the rail member and sliding member may have a motor or solenoid to extend and retract the sliding member with respect to the rail member. This automates loading and unloading the bicycle, moped, or motorcycle.

Figure 23:
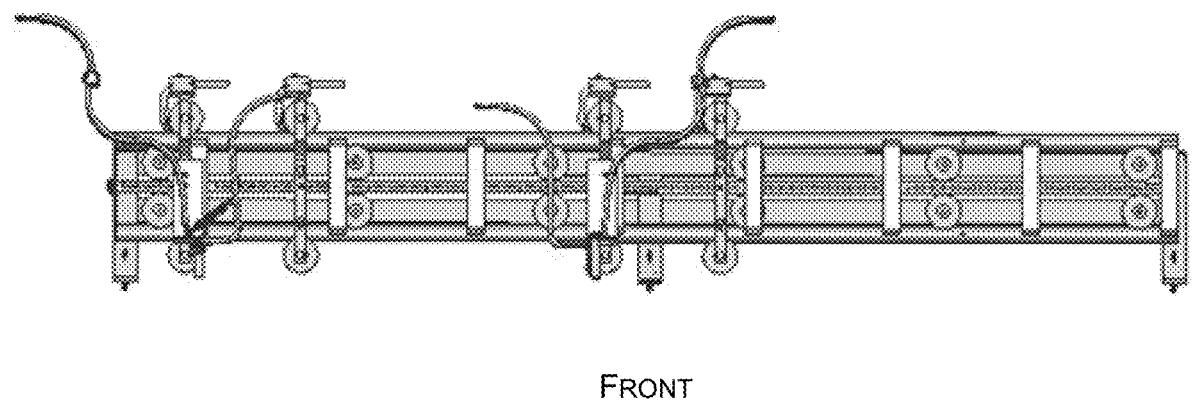
FIG. 23 is a front view of the example storage system shown in FIG. 22.

FIG. 23 is a front view of the example storage system shown in FIG. 22.

Figure 24:
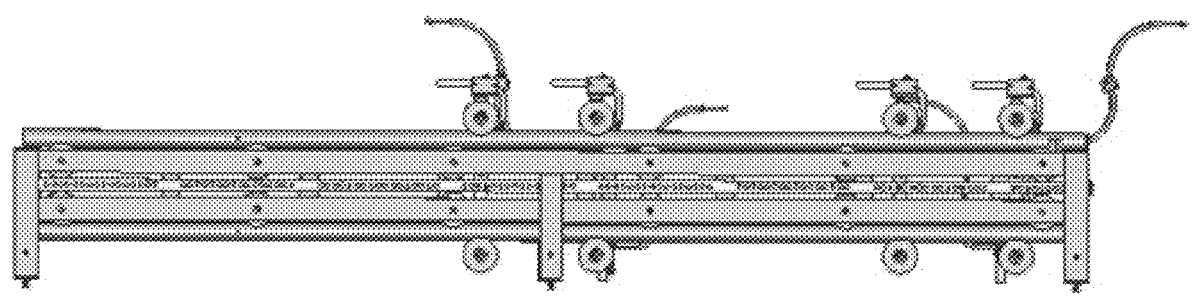
FIG. 24 is a rear view of the example storage system shown in FIG. 22.

FIG. 24 is a rear view of the example storage system shown in FIG. 22.

Figure 25:
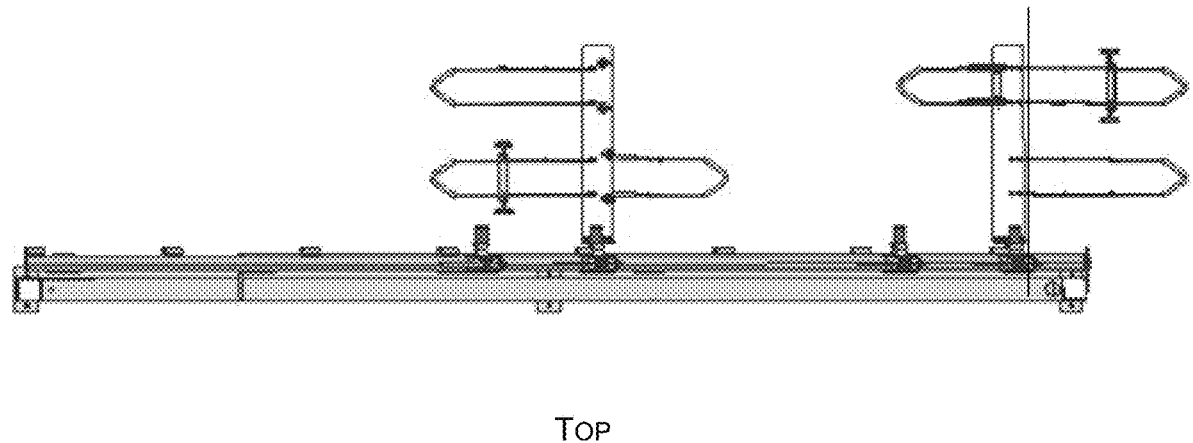
FIG. 25 is a top view of the example storage system shown in FIG. 22.

FIG. 25 is a top view of the example storage system shown in FIG. 22.

Figure 26:
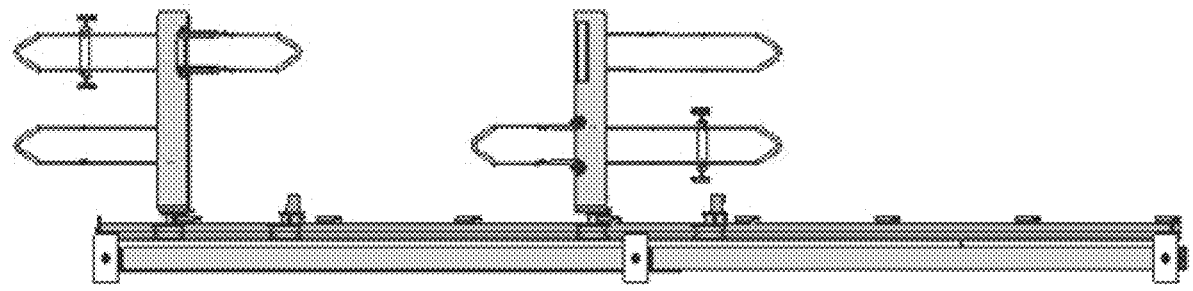
FIG. 26 is a bottom view of the example storage system shown in FIG. 22.

FIG. 26 is a bottom view of the example storage system shown in FIG. 22.

Figure 27:
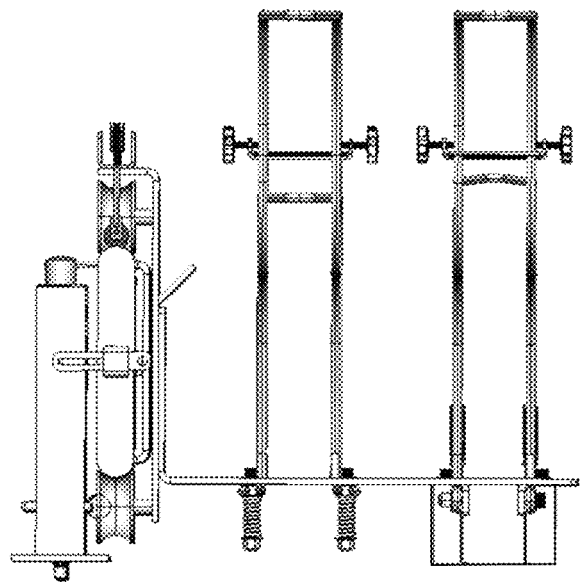
FIG. 27 is a left side view of the example storage system shown in FIG. 22.

FIG. 27 is a left side view of the example storage system shown in FIG. 22.

Figure 28:
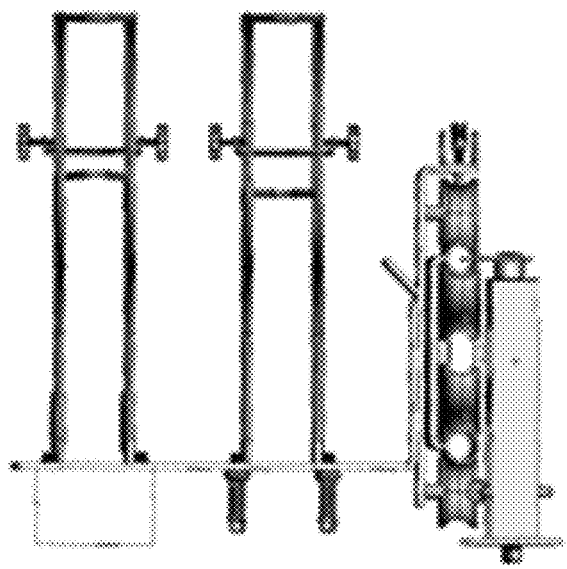
FIG. 28 is a right side view of the example storage system shown in FIG. 22.

FIG. 28 is a right side view of the example storage system shown in FIG. 22.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific dimensions, quantities, material types, fabrication steps and the like can be different from those described above in alternative embodiments. The term "coupled" is used herein to express a direct connection as well as a connection through one or more intervening circuits or structures. The terms "example," "embodiment," and "implementation" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

While the present disclosure has been disclosed with respect to a limited number of embodiments, those skilled in the art, having the benefit of this disclosure, will appreciate numerous modifications and variations possible given the description. It is intended that the appended claims cover such modifications and variations as fall within the true spirit and scope of the disclosure.

The invention claimed is:

1. A quick-detach storage system with configurable compartments for a vehicle bed, comprising:
    a first anchor attachable to the vehicle bed, the first anchor including a U-channel for receiving a first end of the rail member;
    a second anchor attachable to the vehicle bed, the second anchor comprising a screw clamp or a securing mechanism to secure a second end of the rail member to the second anchor;
    a rail member attachable to the first anchor and the second anchor, the rail member detachable from the first anchor and the second anchor via first and second respective quick-detach mechanisms;
    a sliding member supported by the rail member, the sliding member capable of movement with respect to a length dimension of the rail member; and
    at least one basket or container removably attachable to the sliding member.

2. The quick-detach storage system of claim 1, wherein a height dimension of the at least one basket or container is less than a height dimension of the sliding member and the rail member.

3. The quick-detach storage system of claim 1, wherein one or both of the first anchor and the second anchor are attachable to one or more walls of the vehicle bed by one of magnets, metal screws, bolts, or an adhesive.

4. The quick-detach storage system of claim 1, further comprising:
    a base member of the first anchor or the second anchor permanently attachable to the vehicle bed;
    a removable part of the first anchor or the second anchor removably attachable to the respective base member; and wherein the base member of the first anchor or the second anchor is substantially flush with a surface of the wall of the vehicle bed.

5. The quick-detach storage system of claim 1, wherein the sliding member further comprises slots, holes, hooks, hangers, magnets, clasps, or clips for a temporary attachment of the at least one basket or container to the sliding member.

6. The quick-detach storage system of claim 5, wherein the at least one basket or container hangs by gravity from the sliding member via the temporary attachment to the sliding member.

7. The quick-detach storage system of claim 1, wherein the at least one basket or the container is capable of securing a liquid.

8. The quick-detach storage system of claim 1, wherein the sliding member is capable of extending from a retracted state with respect to the rail member to an extended state with respect to the rail member past an end of the vehicle bed to carry the at least one basket or container past the end of the vehicle bed.

9. The quick-detach storage system of claim 8, wherein the sliding member is capable of extending from the rail member past the end of the vehicle bed for a distance of at least three-fourths a length of the retracted state of the sliding member and the rail member.

10. A quick-detach storage system with configurable compartments for a vehicle bed, comprising:
a first anchor attachable to the vehicle bed;
a second anchor attachable to the vehicle bed;
a rail member attachable to the first anchor and the second anchor, the rail member detachable from the first anchor and the second anchor via first and second respective quick-detach mechanisms;
a sliding member supported by the rail member, the sliding member capable of movement with respect to a length dimension of the rail member; and
at least one basket or container removably attachable to the sliding member, wherein the at least one basket or container comprises a rack for securing a bicycle, a moped, or a motorcycle.

11. The quick-detach storage system of claim 10, wherein the rack comprises a first apparatus or mechanism for securing a front tire of the bicycle, the moped, or the motorcycle and a second apparatus or mechanism for securing a rear tire of the bicycle, the moped, or the motorcycle.

12. The quick-detach storage system of claim 11, wherein the first apparatus or mechanism and the second apparatus or mechanism are capable of moving independently of each other along the sliding member or the rail member.

13. The quick-detach storage system of claim 10, further comprising a motor or solenoid connected to the sliding member to extend and retract the sliding member with respect to the rail member.

14. A quick-detach storage system with configurable compartments for carrying or storing items in a vehicle bed, comprising:
a rail member;
a sliding member supported by the rail member, the sliding member capable of moving with respect to a length dimension of the rail member;
an end bracket of the rail member for removably hanging the rail member on or from a first wall of a vehicle bed; and
a side bracket of the rail member for removably hanging the rail member on or from a second wall of the vehicle bed; and
an attachment member for joining a first instance of the quick-detach storage system to a second instance of the quick-detach storage system in the vehicle bed.

15. The quick-detach storage system of claim 14, wherein the sliding member further comprises slots, holes, hooks, hangers, magnets, clasps, or clips for removably securing at least one basket or container to the sliding member.

16. The quick-detach storage system of claim 14, wherein the at least one basket or container is capable of securing a liquid.

17. The quick-detach storage system of claim 14, wherein the at least one basket or container is capable of securing a bicycle, a moped, or a motorcycle.

18. The quick-detach storage system of claim 14, wherein the sliding member is capable of extending with respect to the rail member past an end of the vehicle bed.

19. The quick-detach storage system of claim 1, further comprising a motor or solenoid connected to the sliding member to extend and retract the sliding member with respect to the rail member.

20. The quick-detach storage system of claim 1, further comprising an attachment member for joining a first instance of the quick-detach storage system to a second instance of the quick-detach storage system in the vehicle bed.

* * * * *